(12) United States Patent
Rungta et al.

(10) Patent No.: US 11,863,563 B1
(45) Date of Patent: Jan. 2, 2024

(54) POLICY SCOPE MANAGEMENT (71) Applicant: Amazon Technologies, Inc., Reno, NV (US)

(72) Inventors: Neha Rungta, San Jose, CA (US); Tyler Stuart Bray, San Diego, CA (US); Kasper Søe Luckow, Sunnyvale, CA (US); Alexander Watson, Seattle, WA (US); Jeff Puchalski, Seattle, WA (US); John Cook, Brooklyn, NY (US); Michael Gough, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 301 days.

(21) Appl. No.: 15/923,832

(22) Filed: Mar. 16, 2018

(51) Int. Cl.
*H04L 9/40* (2022.01)

(52) U.S. Cl.
CPC ............ *H04L 63/105* (2013.01); *H04L 63/20* (2013.01)

(58) Field of Classification Search
CPC ..... H04L 63/20; H04L 63/10; H04L 63/1408; H04L 67/22; H04L 63/102; H04L 63/105; G06F 21/6245; G06F 2221/2141; G06F 21/50; G06F 11/3065; G06F 21/316
See application file for complete search history.

(56) References Cited

U.S. PATENT DOCUMENTS

| | | | | |
|---|---|---|---|---|
| 8,813,225 | B1* | 8/2014 | Fuller | H04L 67/51 726/25 |
| 9,311,495 | B2* | 4/2016 | Readshaw | G06F 21/604 |
| 2005/0027837 | A1* | 2/2005 | Roese | H04L 41/0893 719/318 |
| 2008/0184336 | A1* | 7/2008 | Sarukkai | G06F 21/6218 726/1 |
| 2009/0164499 | A1* | 6/2009 | Samudrala | G06F 21/604 707/999.102 |
| 2014/0359692 | A1* | 12/2014 | Chari | G06F 21/31 726/1 |
| 2017/0163650 | A1* | 6/2017 | Seigel | H04L 63/102 |
| 2017/0295197 | A1* | 10/2017 | Parimi | H04L 63/10 |
| 2017/0346837 | A1* | 11/2017 | Vaswani | H04L 63/102 |
| 2018/0255102 | A1* | 9/2018 | Ward | H04L 63/20 |

* cited by examiner

*Primary Examiner* — Trang T Doan
(74) *Attorney, Agent, or Firm* — Hogan Lovells US LLP (57) ABSTRACT

The appropriate scoping of an access policy can be determined using the observed access and usage of various resources covered under that policy. Information about access requests received over a period of time can be logged, and actions represented in the log data can be mapped to the permissions of the access policy. A new access policy can be generated that includes grant permissions only for those actions that were received and/or granted during the monitored period of time. The new policy can be processed using policy logic to ensure that changes in permission comply with rules or policies for the target resources. The new policy can be at least partially implemented, or can be provided to an authorized user, who can choose to adopt or deny the new policy, or to accept some of the recommendations for modifying the current policy.

19 Claims, 6 Drawing Sheets

FIG. 1

User A permissions at time t1

| Permission | Status | Uses |
|---|---|---|
| Read | Granted | 3 |
| Write | Granted | 0 |
| Execute | Granted | 0 |
| List | Granted | 6 |
| Modify | Granted | 0 |
| Full Control | Granted | 0 |

FIG. 2A

User A permissions at time t2

| Permission | Status | Uses |
|---|---|---|
| Read | Granted | 3 |
| Write | Denied | 0 |
| Execute | Denied | 0 |
| List | Granted | 6 |
| Modify | Denied | 0 |
| Full Control | Denied | 0 |

POLICY SCOPE MANAGEMENT

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Users can perform tasks such as storing data to various types of resources offered by a resource provider. The user often will have rules and policies regarding access to the user data, which may be in addition to any access policies of the resource provider. While providing a robust and flexible policy framework provides capabilities users desire, the complexity can result in policies that do not perform as expected. Further, the complexity can lead to users being granted different permissions than required or intended due in large part to the difficulty in determining the permissions that should actually be granted to a particular set of users.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of access and actions with respect to data and resources in an electronic environment. In particular, various embodiments provide for the scoping of policies, such as access policies, based upon observed access and usage of various resources covered under those policies. An initial access policy may be implemented to determine whether to grant access requests received over a period of time. Information about access requests received over that period of time can be logged, then analyzed to determine patterns of access to the corresponding resources. Actions represented in the log data can be mapped to the permissions of the access policy, and permissions that were utilized to grant access over that period can be determined. A new access policy can be generated that includes grant permissions only for those actions that were received and/or granted during the monitored period of time. The new policy can be processed using policy logic, such as to ensure that any changes in permission result in a narrowing of the scope of permissions, or that any increase in scope does not violate other permissions or rules, among other such options. The new policy can then be provided to an authorized user as a recommendation that provides for modified scoping of permissions. The user can then choose to adopt the new policy, or can choose to accept at least some of the recommendations for narrowing the current policy, among other such options.

Various other such functions can be used as well within the scope of the various embodiments as would be apparent to one of ordinary skill in the art in light of the teachings and suggestions contained herein.

Figure 1:
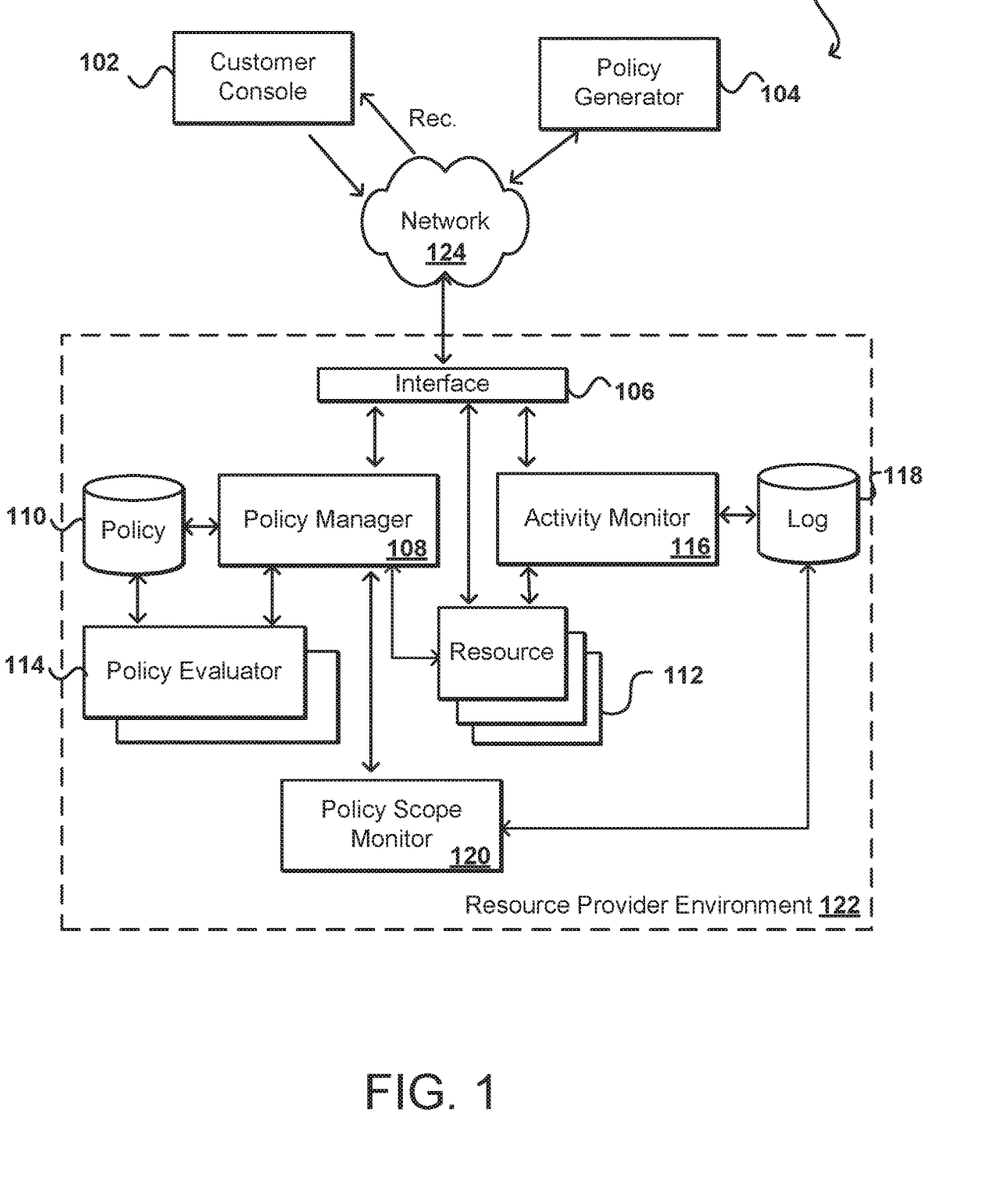
FIG. 1 illustrates components of an example system for managing policy scope that can be utilized in accordance with various embodiments.

FIG. 1 illustrates an example system 100 that can be utilized to implement aspects of the various embodiments. In this example, a policy manager 108 can manage policies to be applied to, and enforced for, various electronic resources 112. Policies can be applied to other resources or entities as well as discussed elsewhere herein, as may include users or organizations, among other such options. The policies in some embodiments include access policies or trust policies that define permissible actions that can be taken by specific users or entities with respect to the applicable electronic resources, or applications or services supported by those resources. The electronic resources can include any physical or virtual resources capable of receiving, storing, processing, and/or transmitting data electronically, as may include servers, databases, virtual machines, and the like. The policy manager 108 can store the policies to a policy data store 110, or other such location, and ensure that the relevant policies are enforced at least with respect to access to the relevant resources 112.

The policies can be received from a variety of different sources. For example, a customer can provide a customer-generated or customer-obtained policy through a customer console 102 or other such mechanism, which can call into an appropriate application programming interface (API) or other element of an interface layer 106 in order to provide the policy to the policy manager 108. A customer can also use such a mechanism to modify or delete such a policy, among other such options. In some instances the policy might be generated automatically or through a software mechanism such as a policy generator 104, which can be under control of a provider of the resources 112 or another authorized entity. If at least a subset of the resources is contained within a resource provider environment or multi-tenant environment, the policy generator 104 may be internal and/or external to that environment in different embodiments.

As mentioned, it can be difficult to properly generate, update, and/or configure policies to properly manage access by a variety of users to a variety of resources storing different types of data and performing different types of actions. Various users will want the ability to create precise access control policies, but this flexibility comes at the cost of added complexity, which makes it more likely that the policies will not be configured properly in all instances. Various embodiments provide a rich policy language that provides for a large variety of functionality, but the language is not complete and it can be difficult for users to understand all the various constructs of the policy language. This can lead to potential problems such as incorrect scoping of a policy. As used herein, "scoping" refers to determining the range or "scope" of permissions granted to specific users, groups or users, or types of users under a specific policy. In at least some embodiments, each user would be granted only the permission that are required by the user, and intended to be granted to that user under the policy, and would be denied any other permission that is otherwise available to be granted under the policy. As mentioned, however, the complexity of the policies and the applicable resource environment, as well as the potential for a large number of users of many different types, can make proper scoping difficult at best.

Accordingly, approaches in accordance with various embodiments can provide a mechanism for dynamically adjusting the scope of permissions granted under a policy based at least in part upon the type of activity monitored with respect to the policy. This can include, for example, utilizing an activity monitor 116 or other such system or service that can cause event data, or other such information, to be written to a log data store 118 or other such repository in response to an action being performed, request being submitted, or detection of another such occurrence with respect to the monitored resources 112. The actions can include any relevant actions, such as the reading or writing of a data object to a respective data store. The information can include, or be linked to, the policy under which the permission to perform that action was granted. In other embodiments, the data might instead be linked to the user or resource, and the applicable policy can subsequently be determined using policy data for the user or resource, among other such options. In this way, any actions taken under permissions granted by a specific policy over a period of time will be reflected in the logged data.

A system or service such as a policy scope monitor 120 can periodically, or at any other appropriate time, analyze the event data in the log repository 118 to determine whether any adjustments may be recommended to the scope of the policy based at least in part upon the determined actions or events. For example, a given user might have been granted full access under the policy, which might include permission to perform nine different types of action. Over a period of time, it might be determined that the identified user only utilized three of those permissions. Accordingly, it could be recommended in at least some embodiments for the policy to be adjusted to only maintain the permissions for those three types of actions, and withdraw the other six types of permissions. Such an approach can provide a type of least privileged access, where it is desired, for example, to keep the scope of the permissions restricted to only those needed by any particular users. In some embodiments this adjustment could be made automatically, or in conjunction with an appropriate permission adjustment policy that might indicate various timings, priorities, or criteria for adjusting the permissions granted under a policy. In at least some embodiments these adjustments may be made as recommendations, however, as a user may want or need to keep a permission that is not used frequently, or at least was not utilized over the respective monitoring period. There also can be various policies or criteria used for recommending permissions to withdraw, such as where certain types of users always maintain certain types of permissions, such as read permissions and the like. The changing of permissions in some embodiments can be approved by the users themselves, while in other embodiments the changes will be approved by a policy administrator or other such entity.

In such a process, policies can continue to be provided using conventional approaches. For example, a user can submit a policy through a customer console 102, which can be received to the resource provider environment 122 and directed to a policy manager 108 or other such system or service. The policy manager 108 can work with one or more policy evaluators 114, or policy logic analyzers, to attempt to validate the policy with respect to the targeted resources 112, and ensure that the policy complies with all relevant policy guidelines, rules, and criteria, as may be set by the customer, the resource provider, or another such entity. The policy, if approved, can then be stored to a policy data store 110 or other such location for use in evaluating future access requests for the relevant resources 112.

Once approved, the policy can be used to grant permission to perform various actions with respect to the corresponding resources. Requests for access can be evaluated, whether by the policy manager 108 or a separate resource manager or access manager (not shown), among other such options. At least for access that is permitted, information for the access can be stored to the log data store 118. The policy scope monitor 120 can then access the log information for a relevant time period (or all information in some embodiments) to obtain information about the set of permissions that were granted and executed under the policy. As mentioned, this can include information about the types of permissions executed by the various users over that period of time. The policy scope monitor 120 can then create one or more recommendations for a new or updated policy that corresponds more closely to the actual usage of resources under the policy. These permissions could include access granted to services, or users to actions, among other such options. If the permissions that are granted are not used within a given time period, this can be potentially indicative that certain permissions are extraneous, or are no longer required, for the customers for their intended usage. In some embodiments the recommendations will indicate changes to scope that may be made to an existing policy, while in other embodiments the recommendation may include a new policy that is based at least in part upon the recommended changes in scope. The new policy in some embodiments can strictly reduce the access allowed in the original policies, or earlier versions of the policies, based on the usage pattern, and does not remove any denies specified in the policy. In some embodiments the removals of one or more denies may be recommended based upon received requests as well, but those may require at least some level or type of approval by an authorized entity. As mentioned, in still other embodiments the scope can be increased, denied, or a combination thereof based at least in part upon the monitored activity over the relevant period(s) of time.

In some embodiments the new policy is presented to the customer, such as through the customer console 102, as a recommendation. The customer, or an authorized user, may then choose to accept the new policy in lieu of their original policy, or may select to discard the new policy. In other embodiments the user may modify either the new or existing policy to include some of the recommended changes in scope, as well as to potentially make other adjustments to the policy. In some embodiments the generated policy can be reviewed by the policy evaluator 114 to not only ensure that it meets all relevant policy requirements, but also to ensure that the changes in scope are permissible. This can include, for example, ensuring that the scope of permissions is reduced where any changes are recommended, and that there is no inadvertent increasing in scope where such increasing is not permitted. The policy evaluator 114 can also ensure that the new recommended policy does not unintentionally restrict access to any infrastructure that was previously allowed. The evaluator can ensure that the policy still corresponds to the same set of resources, such as the same data stores, buckets, tables, query services, messaging topics, and the like. The permissions may also relate to individual data objects or other such components or services as known for use with access management policies. The event data can also be logged from search services, request managers, API events, and other such occurrences as discussed and suggested herein.

Figure 2A:
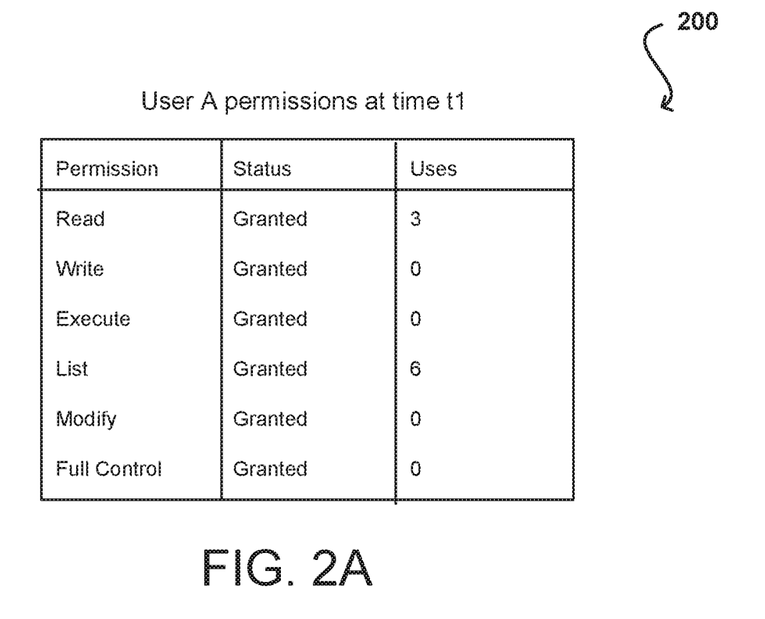
FIGS. 2A and 2B illustrate an example approach to dynamically scoping policy permissions based on observed activity that can be utilized in accordance with various embodiments.
Figure 2B:
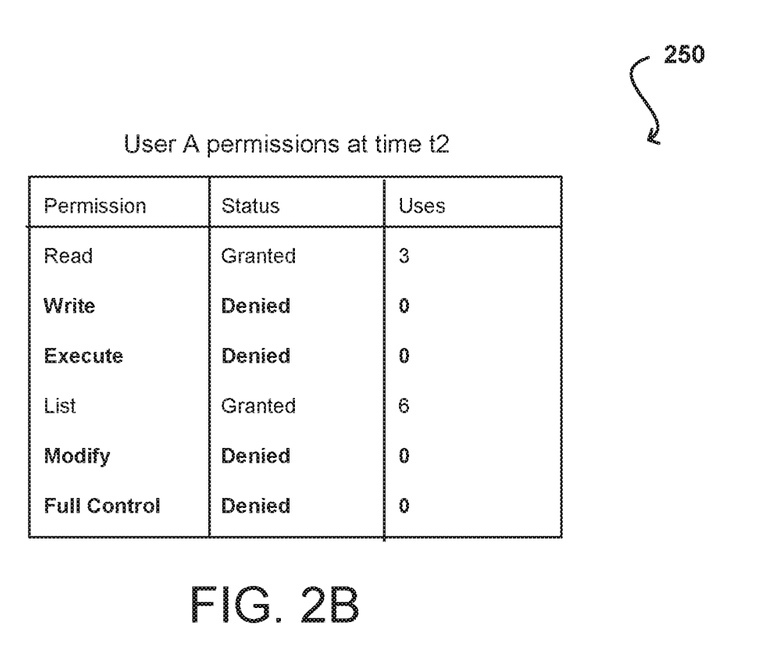

FIGS. 2A and 2B illustrate an example recommendation that might be included in a new policy that can be provided in accordance with various embodiments. In the example set of permissions 200 indicated in FIG. 2A, a user (or type of user) is granted full access to a set of resources. In this example, full access refers to access granted for each of six types of actions, including, read, write, execute, list, modify, and full control access. There are various other types of access that can be granted as well as would be understood to one of ordinary skill in the art. Further, there can be different types of access granted for specific sets or subsets of resources, or different types of resources, as discussed and suggested herein. In this example, the information also includes a number of uses (or requests or executions) made by that user (or user type) over a given monitoring period. As illustrated, only two of the six granted permissions were executed by that user over the monitoring period. Accordingly, the recommended policy permissions illustrated in FIG. 2B have kept the granted permissions for the two types of actions that were actually used, but have denied access for the four types of actions that were not actually used. As mentioned elsewhere herein, however there may be other information used to determine the scope of the new access policy to be generated. This can include, for example, examining context information for the various actions or requests for a policy over a period of time. Context information can include any information associated with the request that may be useful in determining the proper permission scope, as may relate to a source address or location, type of user, date and time of the request or action, and the like. This may help to provide permissions corresponding to the context information, such as may permit (or deny) actions during a certain time of day, from a certain geographic region, or from a range or source addresses, among other such options.

Such an approach can help policy administrators and other such users determine how the users are utilizing the various resources. Further, such an approach can help to properly scope the access granted to various users to more closely match the actual requirements. As mentioned, these may be only recommendations in at least some embodiments, as the failure of a given user to perform a type of action or request a type of access during a given period of time is not necessarily indicative of a lack of need for that permission at a future period of time. There may be a balancing in setting the length of the monitoring period, as longer periods of time may capture more types of access, but can also reduce the speed at which changes in scope can be effected using this process. In some embodiments the period of time might be a week, while in other embodiments the period might be thirty, sixty, or ninety days. For high volume access, the period may be significantly shorter, such as on the order of hours or minutes, among other such options.

In one embodiment the generation of a new policy is performed using a predefined policy template created for a particular resource, or set of resources. The API events executed for that resource over a period of time can be determined, and those events can be mapped to the information extracted from the data log. The events can then be mapped to the respective policy statements, to determine the permission under which each event was granted access. The event will also be mapped or associated with the appropriate resource, which at the object level may involve scoping the permission down to a set of prefixes within a given bucket or other such mapping. The mappings can then be used to generate the new policy, such as an ASPN policy among other such options, which can be passed to the policy evaluator 114 to ensure proper down-scoping, so as to be less permissive in each case, with respect to the current or previous policy. Policies can then be refined over time based at least in part upon observed access patterns. Each new policy recommendation can be presented to the authorized user in a number of different ways, such as through a customer console, email message, popup panel, and the like. The user can then have the option of approving, denying, or modifying each recommended policy, among other such options. This may require the user to be authenticated in at least some embodiments to ensure proper modification of the policy.

In at least some embodiments there may be a mechanism to roll back or at least modify some of the changes in a new policy. For example, a user having a permission denied might be able to submit a request to have the permission reinstated. If the user previously had that permission granted then in some embodiments the user may be able to automatically have that permission reinstated, while in other embodiments a person such as a policy administrator or resource administrator might have to approve the change. If this happens for a number of users of the same type, or actions of the same type, then a similar roll back can be performed automatically or suggested for performance, among other such options. Further, there may be many different permissions and objects for a given policy, and in order to minimize user confusion or complexity the permissions and roll backs may be performed at certain levels, such as at the bucket level instead of at the individual object level, etc. For multiple objects, this may include collapsing on the common prefix or otherwise grouping in a human-readable fashion.

In at least some embodiments the recommended policies can be generated at least in part using machine learning. For example, the access patterns of a set of user can be monitored over time and used to train a machine learning model. The access granted under a policy can be monitored over a specific period of time, and that information processed using the machine learning model to determine which permissions should be maintained or denied for the policy. Such an approach not only maintains permissions for actions that were actually taken during the period, but also for permissions that are likely to be utilized based on the machine learning model. Thus, even though a type of user may not have performed a type of action, it can be learned that the user is likely to require that type of action at some point such that the permission can be maintained even though the user did not perform that action during the relevant time period.

In some embodiments, a policy administrator or other such entity can have control over the amount of down scoping that is performed for a specific policy. In embodiments where it is desirable to be as conservative as possible with respect to permissions, the new policy might maintain permissions only for those actions that were taken over the previous period, with all others being denied. In other embodiments recommendations might be made, where the recommendations may become stronger over time as certain actions are still not taken, or there may only be a certain subset of actions included in the recommendations. A level of scoping can also be provided to a machine learning component, which can make recommendations based upon likelihood of certain actions or permissions being needed, among other such options. In at least some embodiments, machine learning can also be used to recommend additions to the policy, or increases in certain permissions, that may be beneficial based on observed behavior. In some embodiments such an approach may also submit recommendations to utilize alternative policies or permissions, such as to change from bucket-level permissions to object-level permissions, or to split a write permission into a put permission and an update permission, among other such options.

When a new user or resource is added to the policy, the initial scoping can be determined in a number of different ways. For example, the initial access may be full access granted as discussed herein, with the eventual set of permissions being adjusted based upon actual usage. In some embodiments an attempt will be made to classify or group the new user or resource with similar users or resources, and apply scoping and permissions similar to those applied for the other users or resources. In some embodiments an initial scope between the two may be granted, such as where the granted permissions are all granted but not all the denied permissions for similar users or resources may be denied. There may be certain types of access that are less critical, or more critical, and these can be configured to either be more or less conservative when it comes to initial restrictions in at least some embodiments.

In some embodiments a summary of the usage over the period can also be presented to an authorized user with the recommended policy. This can help the user to determine whether the recommendations are based upon valid usage data. For example, there may have been one or unauthorized user for whom permissions were granted, and those permissions should be denied for the future policy. Similarly, there may be access granted to certain users that is beyond what they should have been granted, or the resources covered under a given permission may be incorrect. There may be various reasons why the historical usage data may be incorrect, and a user can choose to make modifications based on this, or in some embodiments can provide input to the system as to the invalid or unintended usage data, and the system can generate a new recommended policy using only the valid and intended data over that period, along with potentially any other guidance or input from the user.

In some embodiments, the activity monitor or policy scope monitor may also generate alerts or notifications in response to activity that is determined to be suspicious or inadvertently granted. This might include, for example, the receiving of a suspicious request or performance of a suspicious action. A request might be considered to be suspicious for a number of different reasons, such as an ordering of the information in the request being different than expected, or some of the information for the request being old, invalid, or incorrect. The request might also be of a type not previously received from a certain location, user, or source, or may provide valid security credentials that are not otherwise associated with the source of the request, among other such options. Suspicious actions can include actions performed for any of these requests, as well as actions that are unexpected or of a type not previously associated with a source of the request, or other otherwise satisfy an alert or security criterion, such as exceeding a permissible rate or size, etc. There may be various criteria specified that indicate improper usage or access, and detection of any of these criteria may cause such a system or service to generate a notification, or even an alert, based at least in part upon the severity or type of action. A user may have the option of revoking or denying permission for the specific user, or can choose to modify the policy based upon one or more recommendations in the notification to cause that access permission to no longer be granted for that particular user.

Figure 3:
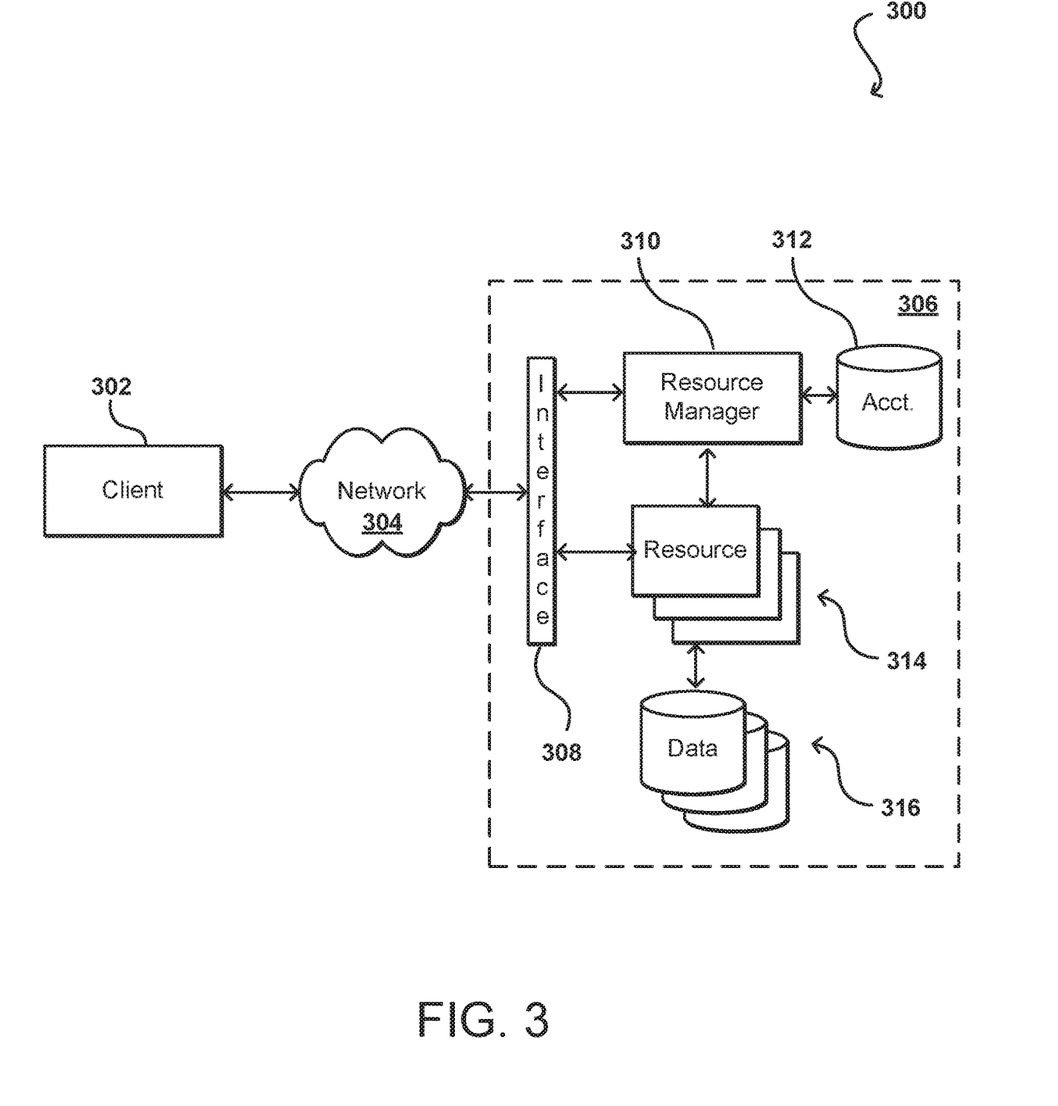
FIG. 3 illustrates components of an example resource environment that can be utilized in accordance with various embodiments.

FIG. 3 illustrates an example environment 300 in which aspects of the various embodiments can be implemented. Such an environment can be used to allocate resources, or resource capacity, for purposes such as to encode or provide media content, among other such options. These can include, for example, the resources 112 for which access requests are received in FIG. 1. This can also include, for example, resources used to provide the interface layer, managers, and monitoring system, among other such options. In this example 300 a user is able to utilize a client device 302 to submit requests across at least one network 304 to a resource provider environment 306. The client device can include any appropriate electronic device operable to send and receive requests, messages, or other such information over an appropriate network and convey information back to a user of the device. Examples of such client devices include personal computers, tablet computers, smart phones, notebook computers, and the like. The network 304 can include any appropriate network, including an intranet, the Internet, a cellular network, a local area network (LAN), or any other such network or combination, and communication over the network can be enabled via wired and/or wireless connections. The resource provider environment 306 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 314 of one or more types. These types can include, for example, application servers operable to process instructions provided by a user or database servers operable to process data stored in one or more data stores 316 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 314 can submit a request that is received to an interface layer 308 of the provider environment 306. The interface layer can include application programming interfaces (APIs) or other exposed interfaces enabling a user to submit requests to the provider environment. The interface layer 308 in this example can also include other components as well, such as at least one Web server, routing components, load balancers, and the like. When a request to provision a resource is received to the interface layer 308, information for the request can be directed to a resource manager 310 or other such system, service, or component configured to manage user accounts and information, resource provisioning and usage, and other such aspects. A resource manager 310 receiving the request can perform tasks such as to authenticate an identity of the user submitting the request, as well as to determine whether that user has an existing account with the resource provider, where the account data may be stored in at least one data store 312 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 302 to communicate with an allocated resource without having to communicate with the resource manager 310, at least until such time as a relevant aspect of the user account changes, the user is no longer granted access to the resource, or another such aspect changes.

The resource manager 310 (or another such system or service) in this example can also function as a virtual layer of hardware and software components that handles control functions in addition to management actions, as may include provisioning, scaling, replication, etc. The resource manager can utilize dedicated APIs in the interface layer 308, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 308 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, a customer of such a resource environment might have data that is stored within the various data stores 316, as well as on-premises or other resources that may be outside the resource provider environment. The data can be managed using various policies that can be administered by a policy manager 108 and stored in a policy database 110 or other such location, as illustrated with respect to FIG. 1. A policy manager in general can refer to a system, service, or component that performs tasks such as creating policies, associating policies with objects, maintaining the associations, providing access to policies, and other such tasks, including those described elsewhere herein.

A policy import engine (or import/export engine) can be used in the resource provider environment, in conjunction with the policy manager, to import user-provided policies (or other policies generated outside the resource provider environment. A policy import engine can refer generally to one or more systems, services, or components that are configured to perform tasks such as the importing and exporting of policies, as well as determining whether those policies are able to be imported or exported, determining any conflicts, verifying ownership or access to various policies for import/export purposes, and the like. In some embodiments one or more policy validators would be contained within the import engine or would be utilized by the policy import engine. The policy import engine can determine the "cloud" policies, or policies of the resource provider environment, that apply to the bucket or other location for which the user data is to be stored, and if the data and/or user policies violate a policy associated with the bucket then the policy can be rejected. In some embodiments the policy manager works with the authorization manager or other such components to determine authorizations of the user in addition to policies to be applied to such usage, and this information can be used for policy validation in addition to other such tasks. This can include, for example, determining which policies to apply for a specific task to be performed on behalf of a user. In some embodiments, federated identities can be used, as may be provided by various third parties, in order to determine the appropriate authorizations, policies, etc. A data manager in some embodiments can manage changes and access to the data, for example, which can be performed in conjunction with an authorization manager, policy manager, etc. The data manager in some embodiments can monitor access to data, as well as the policies applied and used to obtain the access, and can log that information to an audit data store or other such location, enabling subsequent auditing or verification as discussed elsewhere herein.

Once a policy is applied for a resource, or data stored by a resource, for example, the policy should be automatically enforced in the environment or on the storage platform where the data resides. Data management may be based on factors such as compliance requirements, information technology (IT) governance, and security policies that apply for a given user (i.e., enterprise). For example, a user can categorize a set of data as "log" data. The user can then manage all data that falls within this category using a specified set of policies. Data categorized in a separate category, such as "financial critical" data, may be subject to a different set of management policies, as may be specified by contract or otherwise. In order to provide the necessary flexibility for users, policies can be able to be specified for individual data objects. In the example of data on a file system, users manage permissions and metadata on individual files. Managing individual files, however, becomes increasingly difficult as the number of files grows. Similarly, users can be provided with the ability to write data management policies based on data or other classifications specified at the object level. Such ability enables users to exercise more control and better manage their data in the resource provider environment, as may simplify data management. An example includes the writing of a cross-region replication policy for sensitive user data. The policy manager can provide access control to manage permissions for the adding, editing, and removal of policies for data objects stored in the data stores of the resource provider environment 26. The engine in at least some embodiments can ensure that only authorized users have the ability to change policies on a data object, and that any changes are documented and/or logged for future reference.

A user can provide various types of credentials in order to authenticate an identity of the user to the provider, which can be used for claims validation and other operations discussed and suggested herein. These credentials can include, for example, a username and password pair, biometric data, a digital signature, a signed certificate, or other such information. These credentials can be provided by, or obtained from, a number of different entities, such as an identity manager, identify provider, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity manager can provide the credentials, also stored to a credential data store, to the resource provider environment and/or to the client device, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors. Although discussed as external to the resource provider environment, it should be understood that the identity manager can be a logical part of the resource provider environment in some embodiments.

Figure 4:
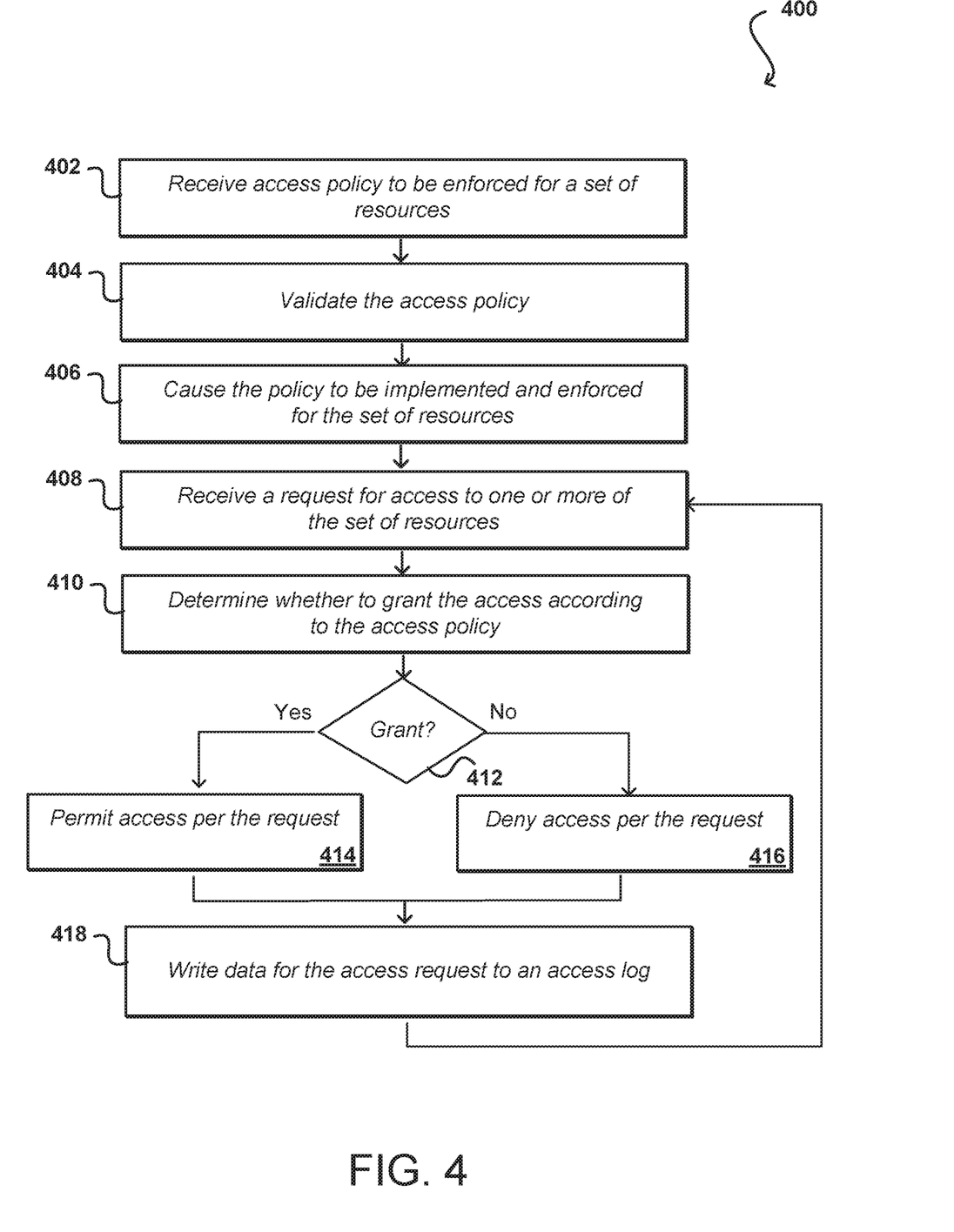
FIG. 4 illustrates an example process for monitoring access data under a policy that can be utilized in accordance with various embodiments.

FIG. 4 illustrates an example process 400 for monitoring access permitted under an access policy that can be utilized in accordance with various embodiments. It should be understood that for this and other processes discussed herein that additional, fewer, or alternative steps can be performed in similar or alternative steps, or in parallel, within the scope of the various embodiments unless otherwise stated. Further, although access policies are discussed for purposes of explanation, it should be understood that various other types of policies or rules can take advantage of advantages of the various embodiments as well. In this example, an access policy is received 402 that is to be enforced for a set of resources. As mentioned, the policy can be received from a customer or third party, or may be generated by a provider managing the resources to be accessed, among other such options. Further, the set of resources may be specified by the policy request, or may be learned based at least in part upon information associated with the request or a customer account, etc. Before implementing the policy, the access policy can be validated 404 to ensure that the policy complies with any rules or guidelines for access policies or the set of resources to be accessed. This can include, for example, ensuring that any permissions in the policy do not exceed the scope of permissions capable of being provided, as well as ensuring that the permissions are well defined and comply with any policy formatting or other such requirements. In at least some embodiments, the policy may be validated against permissions granted to users under the customer account to ensure that the policy reflects the appropriate permissions. Once any validations or other such processing is performed successfully, the access policy can be caused 406 to be implemented and enforced for the set of resources. As mentioned, the resources are not limited to physical resources, such as servers and data storage devices, but can include other types of resources such as virtual resources, services, and data objects as well, within the scope of the various embodiments.

Once the access policy is in place, a request can be received 408 for access to one or more of the set of resources. The request may specify the resource(s), or the need for access to one or more of the resources can be determined upon analyzing the request, etc. The access policy can then be consulted to determine 410 whether to grant the requested access. As mentioned, this can include determining the type of access requested, then consulting the policy to see whether that type of access is permitted for that user, type of user, device, or other source of the request, at least with respect to the target resource(s). If it is determined 412 that the access is to be granted, then the access can be permitted 414 per the request. Any limitations on the permissions can be enforced as discussed and suggested herein. If the access is not to be granted, then the access can be denied 416 and an error message or other notification returned in at least some embodiments. Regardless of whether the access is granted in at least some embodiments, data for the access request can be written 418 to an access log or other such location for subsequent analysis. As mentioned, the log data can be stored indefinitely or for a monitoring period of time, among other such options.

Figure 5:
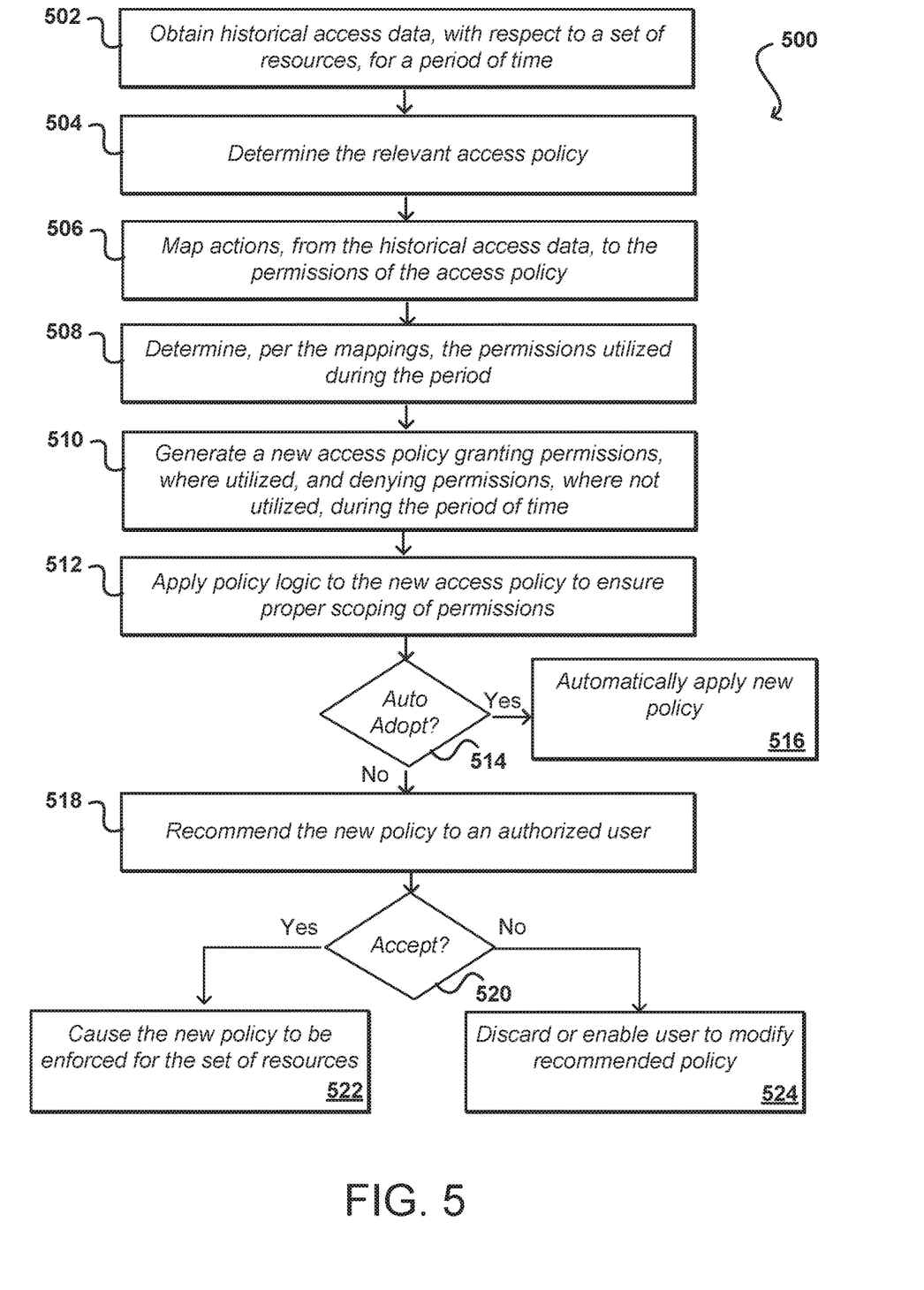
FIG. 5 illustrates an example process for recommending an access policy using monitored access data that can be utilized in accordance with various embodiments.

FIG. 5 illustrates an example process 500 for recommending a new access policy for a customer of a resource provider environment that can be utilized in accordance with various embodiments. In this example, a set of historical usage data can be obtained 502 with respect to a set of resources, such as the log data generated in the example process 400 of FIG. 4. This can include information about each action or request received, granted, and/or denied over at least a specified period of time, where the access was to the set of resources and processed using a specified access policy. It should be understood, however, that the historical data may include various other types of data, or data for other policies or resources as well, but that the data accessed will be of the type discussed herein. If not already known, the relevant access policy can be determined 504 that was used to process the access requests over that period of time. The data can represent a set of actions that were performed, and those actions can be mapped 506 to permissions of the access policy. For example, a writing of data to a resource might be analyzed to determine whether it was, or should properly have been, granted access under a write permission, a modify permission, a full control permission, or a put permission. Such a process can be used to determine at least which permissions were utilized over that period of time, and in some cases the extent to which those permissions were utilized. The extent information may be particularly useful when processing the information using machine learning to recognize usage patterns or otherwise classify the various permission options.

In this example the utilized permissions can be utilized to generate 510 a new access policy to be recommended for the set of resources. This can include, for example, obtaining a template policy for the resources and granting permissions only where those permissions were utilized over the monitored period of time, although flexibility in the selection can be utilized in some embodiments as discussed and suggested herein. The new policy can also deny permissions where no action was performed or requested, or where the action or request was denied, over that monitored period. This sets the scope of the policy to permit only those actions that were permitted over the monitored period of time. In some embodiments, the success of the action may be considered in determining whether to grant the permission. Before implementing or recommending the policy, at least some policy logic can be applied 512 to ensure proper scoping of the permissions. This can involve ensuring that each change to the new policy is permissible under relevant rules or policies for the resources. In some embodiments, this can include ensuring that each such change, relative to the prior policy, is at most of the same scope or results in a smaller scope, and that no change inadvertently broadens the scope. As mentioned, there may be embodiments where the scope is broadened, or where certain permission scope is broadened for a policy while others are decreased in scope, among other such options. Certain embodiments that utilize machine learning may also recommend alternative permissions that may have different scope that may be permissible under the relevant policy logic. A determination can be made 514 as to whether the new policy, or any portion of the policy, is able to be automatically implemented. If so, the new policy, or permissible portions, can be automatically applied 516 for enforcement with respect to the target resources. If the new policy cannot be automatically implemented, or there are at least portions that cannot be implemented automatically, the new policy can be recommended 518 to an authorized user or other such entity. This can be submitted through an interface, console, message, notification, or other such options. If it is determined 520 that the user accepts the new policy, then the new policy can be caused 522 to be implemented and enforced for the set of resources for at least a future period of time. If it is determined that the user does not accept the policy, at least in its recommended form, then the policy can be discarded 524 or the user can be enabled to modify the policy as discussed herein. This can include the user accepting or rejecting specific recommendations in the policy, such as any of those that were not automatically implemented, which can then be processed using the policy logic and implemented upon user approval.

Figure 6:
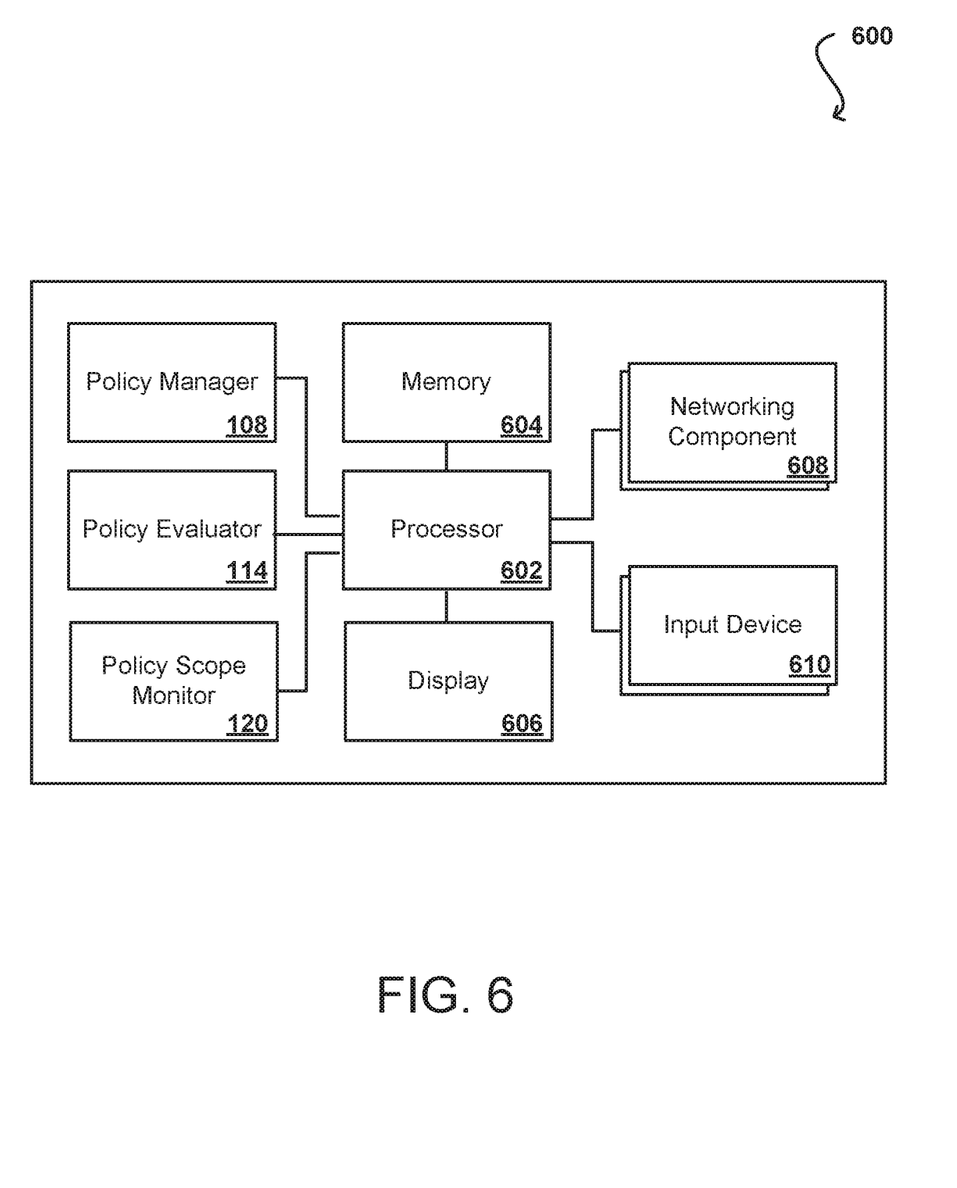
FIG. 6 illustrates example components of a computing device that can be used to implement aspects of various embodiments.

As mentioned, various functionality discussed and suggested herein can be incorporated in one or more computing devices. FIG. 6 illustrates a set of basic components of an example computing device 600 that can be utilized to implement at least aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

In this example, the computing device 600 can take the form of one or more servers, or networked computing devices, that can provide various modules or process, or execute various applications, for performing aspects of various embodiments. In this example, the computing system provides a policy manager 108 that can receive, implement, and/or enforce policies for a set of resources. The computing system can also include a policy evaluator 114 that can validate any policy before that policy is implemented. For new or updated policies, this can include applying policy logic to ensure that any change in permissions is more restrictive, unless otherwise specified or permitted. Further, the computing system can include a policy scope monitor 120 that can determine the usage granted under the various permissions and recommend new or updated policies with a scope determined based at least in part upon the determined usage over the relevant period of time. As mentioned, these and other processes can be performed on multiple machines, and there can be other processes performed on such a machine as well within the scope of the various embodiments.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle °, Microsoft Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, over a period of time, a plurality of requests to access a set of electronic resources in a multi-tenant environment;
   determining whether to grant access to the set of electronic resources based on a first access policy, the first access policy including permissions relating to a set of actions capable of being executed against the set of electronic resources;
   storing access information for the plurality of requests received over the period of time;
   analyzing, after the period of time, the access information to determine a subset of actions, of the set of actions capable of being executed against the set of electronic resources, that were requested during the period of time;
   determining a subset of the permissions of the first access policy that were used to grant the access for the subset of actions;
   generating a new access policy granting permissions only corresponding to the subset of permissions that were used to previously grant access during the period of time and maintaining status of permissions previously denied in the first access policy;
   evaluating the new access policy to check that the new access policy does not restrict access for all actions to one or more of the set of electronic resources previously allowed under the first access policy;
   verifying, using a policy logic, that any change in scope of the permissions as granted in the new access policy does not violate the permissions of the first access policy;
   providing the new access policy as a recommendation with respect to the set of electronic resources;
   determining that permission for access should be granted corresponding to a second subset of permissions, the second subset of permissions not included in the subset of permissions;
   modifying the new access policy to permit access corresponding to the second subset of permissions; and
   causing the new access policy to be enforced for the set of electronic resources in response to receiving acceptance of the new access policy.

2. The computer-implemented method of claim 1, further comprising:
   obtaining a policy template for the set of electronic resources for use in generating the new access policy.

3. The computer-implemented method of claim 1, further comprising:
   permitting acceptance or denial of specific permission change recommendations contained within the new access policy.

4. The computer-implemented method of claim 1, further comprising:
   performing a mapping of at least one of the actions or the electronic resources to the permissions of the first access policy, wherein one or more types of actions for one or more types of electronic resources are able to be mapped to a single permission of the permissions of the first access policy.

5. A computer-implemented method, comprising:
  determining a set of actions performed over a period of time on a set of resources in a multi-tenant environment, the actions performed using access granted according to permissions of a first access policy;
  generating a second access policy granting permission for access corresponding to the actions previously performed during the period of time and denying permission for access corresponding to a subset of actions of the set;
  evaluating the second access policy to check that the second access policy does not restrict access for all actions to one or more of the set of resources previously allowed under the first access policy;
  verifying, using a policy logic, that any change in scope of the permissions as granted in the second access policy does not violate the permissions of the first access policy;
  storing the second access policy for implementation with respect to the set of resources;
  providing the second access policy as a recommendation with respect to the set of electronic resources;
  determining that permission for access should be granted corresponding to at least one of the subset of actions after denying permission for access corresponding to the subset of actions; and
  modifying the second access policy to permit access corresponding to the at least one of the subset of actions.

6. The computer-implemented method of claim 5, further comprising:
  analyzing context information for a set of requests corresponding to the set of actions; and
  generating the second access policy based at least in part upon the context information.

7. The computer-implemented method of claim 6, further comprising:
  generating the second access policy to only grant permission for access corresponding to the actions performed during the period of time.

8. The computer-implemented method of claim 5, further comprising:
  processing data for the set of actions using a machine learning algorithm to determine one or more patterns of usage; and
  generating the second access policy to include permissions determined further from output of the machine learning algorithm, wherein the second access policy is capable of including at least one of a broader scope or an alternative scope of permission with respect to the first access policy.

9. The computer-implemented method of claim 5, further comprising:
  performing a mapping of at least one of the actions to the permissions of the first access policy, wherein one or more types of actions for one or more types of resources are able to be mapped to a single permission of the permissions of the first access policy.

10. The computer-implemented method of claim 5, further comprising:
  determining a second set of actions performed over a second period of time using the set of resources, the actions performed using access granted according to the permissions of the second access policy; and
  generating a third access policy granting permission for access corresponding to the actions performed during the second period of time and denying permission for access corresponding to other actions of the second set.

11. The computer-implemented method of claim 5, further comprising:
  allowing acceptance or denial of specific permission change recommendations contained within the second access policy.

12. The computer-implemented method of claim 5, further comprising:
  allowing setting of a set of rules for adjusting permissions for one or more types of actions; and
  generating the second access policy granting permission for access further determined in part by the set of rules for adjusting permissions, wherein at least a subset of permissions are able to be maintained in absence of corresponding actions being performed with respect to the set of resources.

13. The computer-implemented method of claim 5, further comprising:
  evaluating the second access policy before storing the second access policy for implementation; and
  implementing the second access policy with respect to the set of resources.

14. The computer-implemented method of claim 5, further comprising:
  providing the second access policy as the recommendation through at least one of a user console, a webpage, an email message, an instant message, a notification, or a popup window.

15. The computer-implemented method of claim 5, further comprising:
  detecting a suspicious request during monitoring over the period of time;
  generating an alert for the suspicious request; and
  providing a recommendation to change a permission to deny access corresponding to the suspicious request.

16. A system, comprising
  at least one processor; and
  memory including instructions that, when executed by the at least one processor, cause the system to:
    determine a set of actions performed over a period of time using a set of resources in a multi-tenant environment, the actions performed using access granted according to permissions of a first access policy;
    generate a second access policy granting permission for access corresponding to the actions previously performed during the period of time and denying permission for access corresponding to a subset of actions of the set;
    evaluate the second access policy to check that the second access policy does not restrict access for all actions to one or more of the set of resources previously allowed under the first access policy;
    verifying, using a policy logic, that any change in scope of the permissions as granted in the second access policy does not violate the permissions of the first access policy;
    provide the second access policy as a recommendation for implementation with respect to the set of resources;
    determine that permission for access should be granted corresponding to at least one of the subset of actions after denying permission for access corresponding to the subset of actions; and modify the second access policy to permit access corresponding to the at least one of the subset of actions.

17. The system of claim 16, wherein the instructions when executed further cause the system to:
verify that a scope of permission of the second access policy is narrower than a scope of permission of the first access policy before providing the second access policy for implementation.

18. The system of claim 16, wherein the instructions when executed further cause the system to:
generate the second access policy to only grant permission for access corresponding to the actions performed during the period of time.

19. The system of claim 16, wherein the instructions when executed further cause the system to:
perform a mapping of at least one of the actions to the permissions of the first access policy, wherein one or more types of actions for one or more types of resources are able to be mapped to a single permission of the permissions of the first access policy.

\* \* \* \* \*